(12) United States Patent
Zilio

(10) Patent No.: US 12,240,374 B2
(45) Date of Patent: Mar. 4, 2025

(54) AUTOMOTIVE LIGHT

(71) Applicant: Marelli Automotive Lighting Italy S.p.A. Con Socio Unico, Venaria Reale (IT)

(72) Inventor: Pierfrancesco Zilio, Tolmezzo (IT)

(73) Assignee: Marelli Automotive Lighting Italy S.P.A. Con Socio Unico, Tolmezzo (IT)

( * ) Notice: Subject to any disclaimer, the term of this patent is extended or adjusted under 35 U.S.C. 154(b) by 128 days.

(21) Appl. No.: 18/090,236

(22) Filed: Dec. 28, 2022

(65) Prior Publication Data
US 2023/0211723 A1 Jul. 6, 2023

(30) Foreign Application Priority Data
Dec. 30, 2021 (EP) ..................................... 21218317

(51) Int. Cl.
*B60Q 1/30* (2006.01)
*B60Q 1/24* (2006.01)
*B60Q 1/26* (2006.01)
*B60Q 1/34* (2006.01)
*B60Q 1/44* (2006.01)
(Continued)

(52) U.S. Cl.
CPC ........... *B60Q 1/2696* (2013.01); *B60Q 1/247* (2022.05); *B60Q 1/2603* (2013.01); *B60Q 1/34* (2013.01); *B60Q 1/44* (2013.01); *F21S 43/14* (2018.01); *F21W 2103/20* (2018.01); *F21W 2103/35* (2018.01)

(58) Field of Classification Search
CPC ...... B60Q 1/26; B60Q 1/2603; B60Q 1/2696; B60Q 1/247; B60Q 1/34; B60Q 1/44; F21S 43/14; F21W 2103/20; F21W 2103/35; G09F 13/04; G09F 13/18
See application file for complete search history.

(56) References Cited

U.S. PATENT DOCUMENTS

| 5,193,893 A | 3/1993 | Mitko |
| 2013/0021815 A1* | 1/2013 | Koizumi ............... F21S 43/249 362/511 |
| 2021/0062992 A1 | 3/2021 | Beauchamp et al. |

FOREIGN PATENT DOCUMENTS

| EP | 2570827 A | 3/2013 |
| EP | 4187146 A1 * | 5/2023 ............. B60Q 1/302 |

(Continued)

OTHER PUBLICATIONS

European Seach Report dated May 23, 2022 for European Application No. 21218317.2.

*Primary Examiner* — Jimmy T Vu
(74) *Attorney, Agent, or Firm* — McCarter & English, LLP

(57) ABSTRACT

An automotive light is provided that includes a lighting assembly located inside rear body and is adapted to backlight a transparent or semi-transparent sector of a front half-shell. The lighting assembly includes a pair of light-guide bars made of photoconductive material, which extend toward each other inside the rear body and a pair of electrically-powered light sources that are located within the rear body each adjacent to the distal end of a respective light-guide bar, and are oriented to direct light produced inside the body of the facing light-guide bar. The proximal ends of both light-guide bars are shaped to form respective plate-like heads that are locally substantially coplanar to each other, so as to form/delimit therebetween a small transversal slot.

18 Claims, 5 Drawing Sheets

(51) Int. Cl.
*F21S 43/14* (2018.01)
*F21W 103/20* (2018.01)
*F21W 103/35* (2018.01)

(56) References Cited

FOREIGN PATENT DOCUMENTS

| | | | |
|---|---|---|---|
| FR | 3104237 | B1 | 12/2021 |
| GB | 2553525 | A | 3/2018 |
| JP | H05 77672 | A | 3/1999 |
| JP | 2012113970 | A | 6/2012 |
| WO | 2015/039959 | A1 | 3/2015 |

* cited by examiner

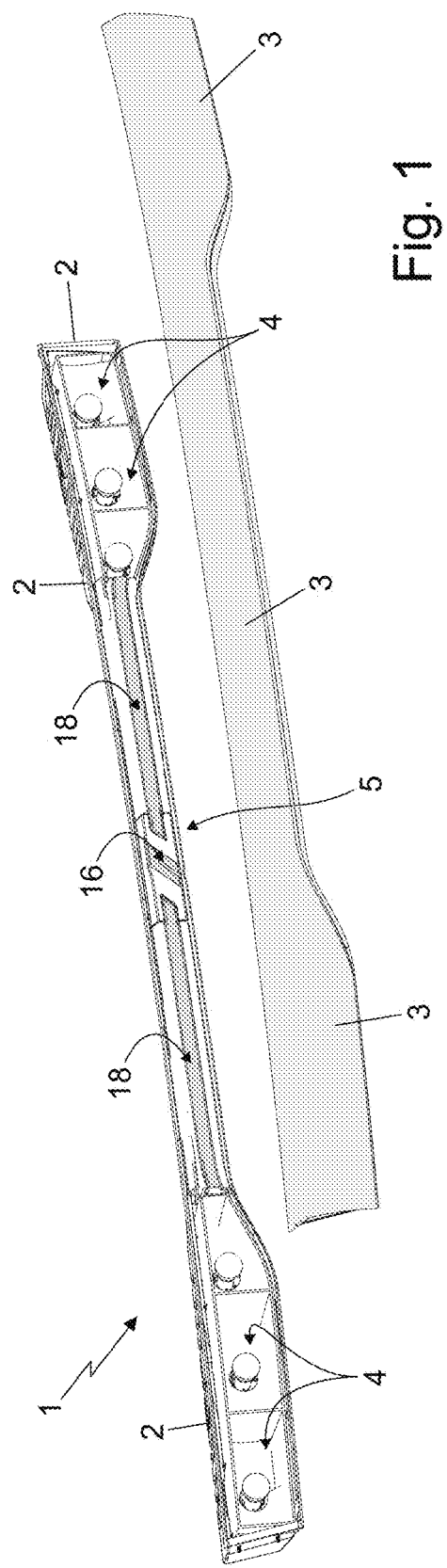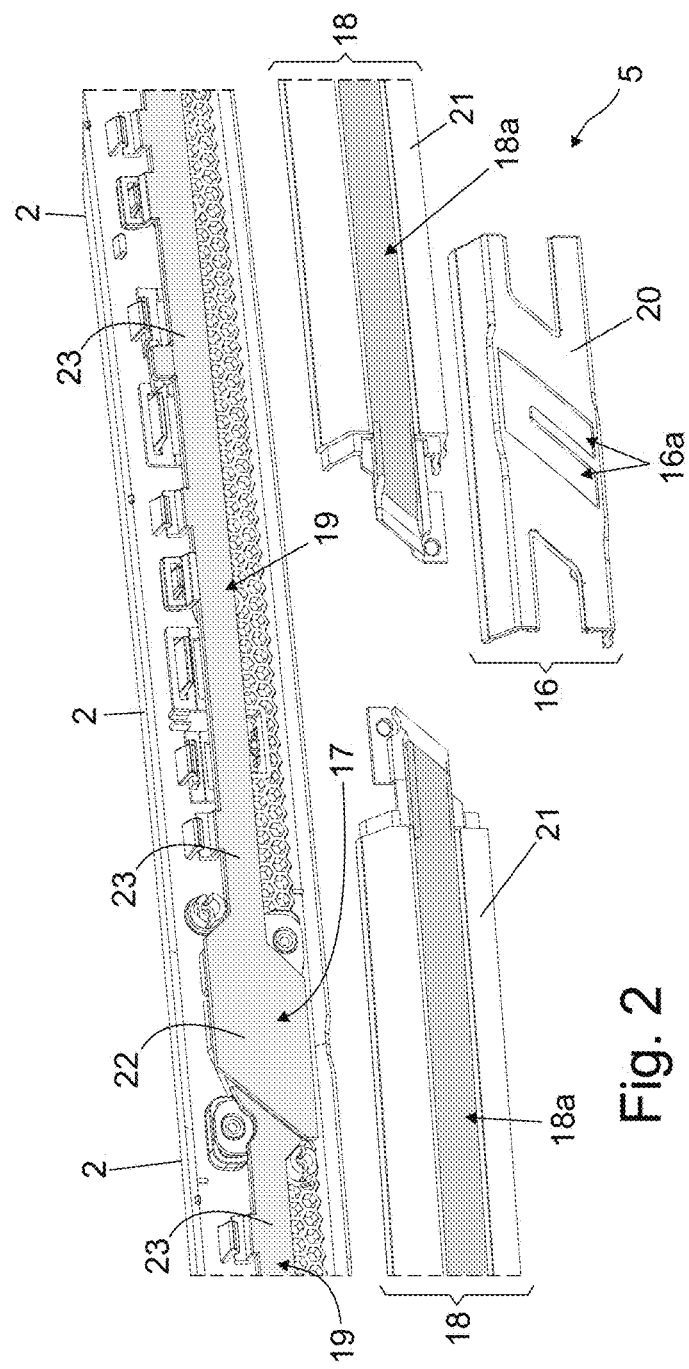

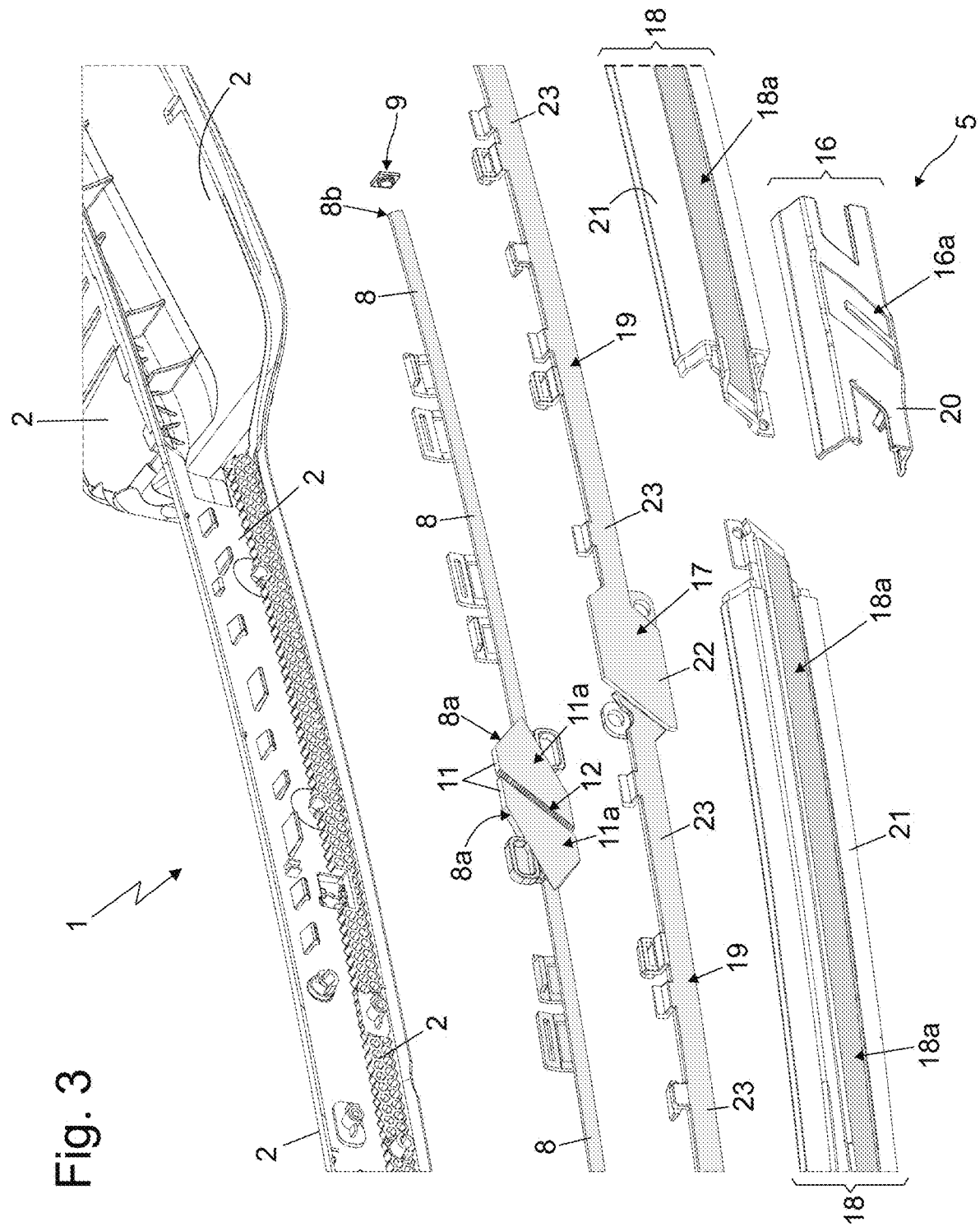

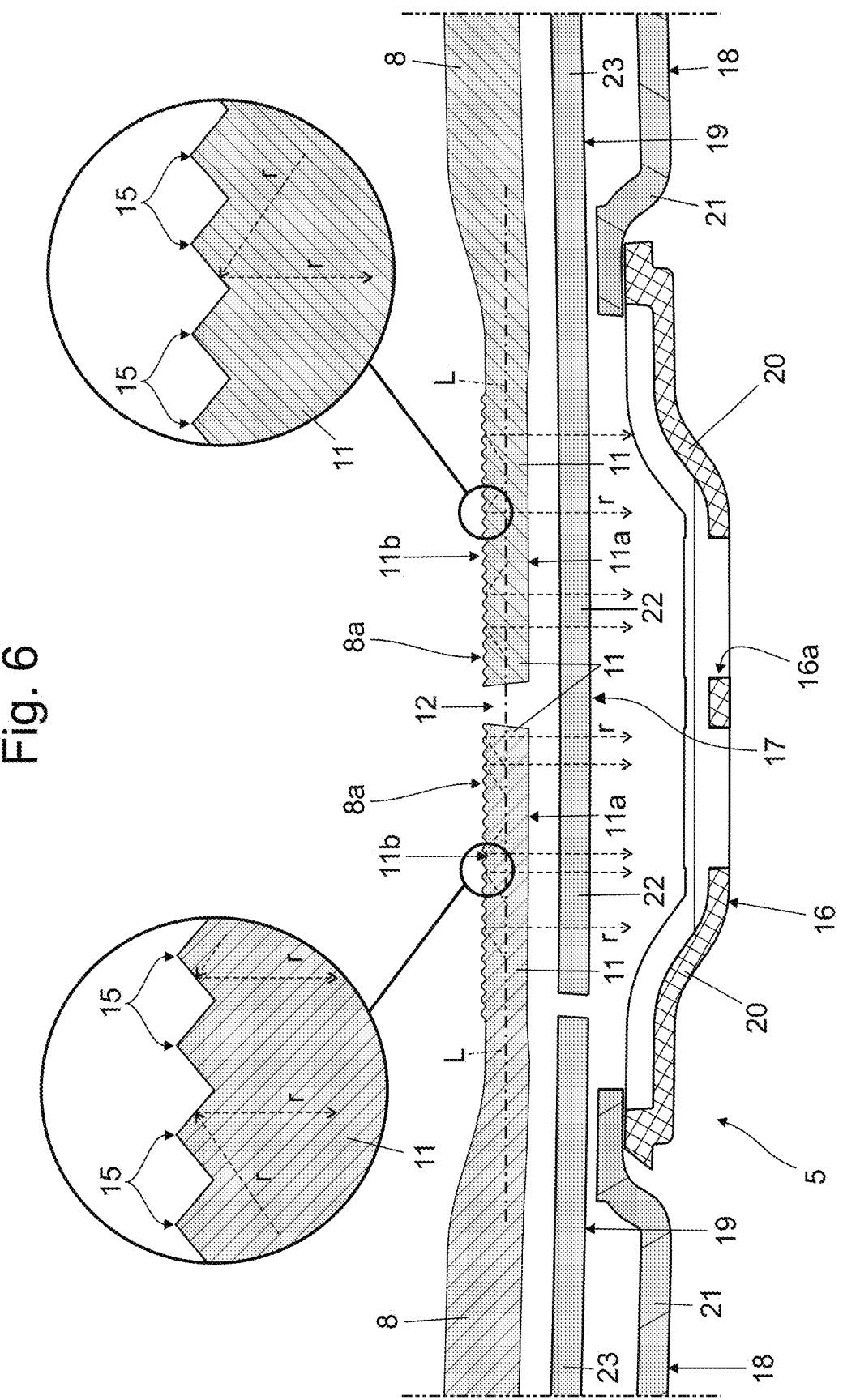

AUTOMOTIVE LIGHT

CROSS-REFERENCE TO RELATED APPLICATION

This patent application claims priority from European patent application no. 21218317.2 filed on Dec. 30, 2021, the entire disclosure of which is incorporated herein by reference.

TECHNICAL FIELD

The present invention relates to an automotive light.

More in detail, the present invention preferably relates to a headlight or taillight for cars and similar vehicles, i.e. a lighting device suitable for being incorporated in a motor vehicle with the function of indicating the position, sudden deceleration and/or direction of turn of the vehicle, and/or the function of lighting the area around the vehicle. Use to which the following disclosure will make explicit reference without thereby losing generality.

BACKGROUND ART

As is known, a headlight or taillight for cars and similar motor vehicles is conventionally a lighting device that is placed in the front, rear or side of the vehicle, and performs the function of lighting the area around the vehicle and/or indicating the position of the vehicle, the sudden deceleration of the vehicle and/or the turning direction of the vehicle, in accordance with certain photometric type-approval standards.

Most taillights for cars and similar motor vehicles usually comprise: a substantially basin-shaped, rigid rear body, which is structured so as to be firmly recessed in a compartment specially made in the rear part of the vehicle body; a front half-shell, which is arranged to close the mouth of the rear body so as to surface outside of the vehicle body, and generally has a plurality of transparent or semi-transparent sectors, usually different in colour from one another; and a series of lighting assemblies that are located inside the rear body, each immediately beneath a respective transparent or semi-transparent sector of the front half-shell, so as to selectively backlight the overlying transparent or semi-transparent sector of the front half-shell.

Usually, each transparent or semi-transparent sector of the front half-shell is moreover uniquely associated with a specific lighting signal, thus each lighting assembly is specifically structured to emit, on command, a light beam that, once exited from the taillight through the corresponding transparent or semi-transparent sector of the half-shell, meets the type-approval specifications (colour and light distribution) for the corresponding lighting signal.

Over the last few years, many car manufacturers have chosen to equip their new car models with oblong tail-lights, which extend over the entire width of the vehicle and produce elaborate light effects that, at night, allow the car model to be uniquely identified.

In other words, the shapes of the taillights and their light effects have become characteristic and distinctive elements of the various car manufacturers.

To make their car models even more recognizable at night, some car manufacturers have recently begun to request oblong taillights that can produce, at centre of the car, a luminous version of the car manufacturer's logo.

In some of the more modern oblong taillights, however, the central part of the taillight already includes a horizontal light-guide bar, particularly long and with a roughly circular cross-section, which receives light from two high-power LEDs (acronym for Light Emitting Diode) placed at the two ends of the same bar, and serves to backlight a specific, substantially ribbon-like, transparent or semi-transparent sector of the front half-shell, which usually acts as a third stop light and/or position light of the car. Unfortunately, the central part of the oblong taillight often has such dimensions as to make it extremely problematic to accommodate an additional lighting assembly capable of backlighting the decorative mask with the car manufacturer's logo.

To overcome this drawback, the Applicant tried to flatten the portion of the horizontal light-guide bar extending underneath the decorative mask, but this solution was immediately set aside because the light coming out of the front face of the plate-like portion of the light-guide bar had a rather low and extremely uneven intensity.

SUMMARY OF THE INVENTION

Aim of the present invention is to provide an oblong taillight which is capable of producing a luminous version of the car manufacturer's logo at the centre of the car and is free from the above-mentioned drawbacks.

In accordance with this aim, according to the present invention there is provided an automotive light as defined in claim 1 and preferably, though not necessarily, in any one of the claims dependent thereon.

BRIEF DESCRIPTION OF THE DRAWINGS

The present invention will now be described with reference to the accompanying drawings, which illustrate a non-limiting embodiment thereof, wherein:

FIG. 1 is a partially exploded, perspective view of an automotive light made according to the teachings of the present invention;

FIG. 2 is a partially exploded, perspective view of the central part of the automotive light shown in FIG. 1, with parts removed for clarity's sake;

FIG. 3 is a second, partially exploded and perspective view of the central part of the automotive light shown in FIG. 1, with parts removed for clarity's sake;

FIG. 5 is a perspective view of the heads of the two light-guide bars shown in FIG. 4; whereas FIG. 6 is a sectional view of the central part of the automotive light shown in FIG. 1, with parts removed for clarity's sake.

DETAILED DESCRIPTION OF THE EMBODIMENTS

Figure 4:
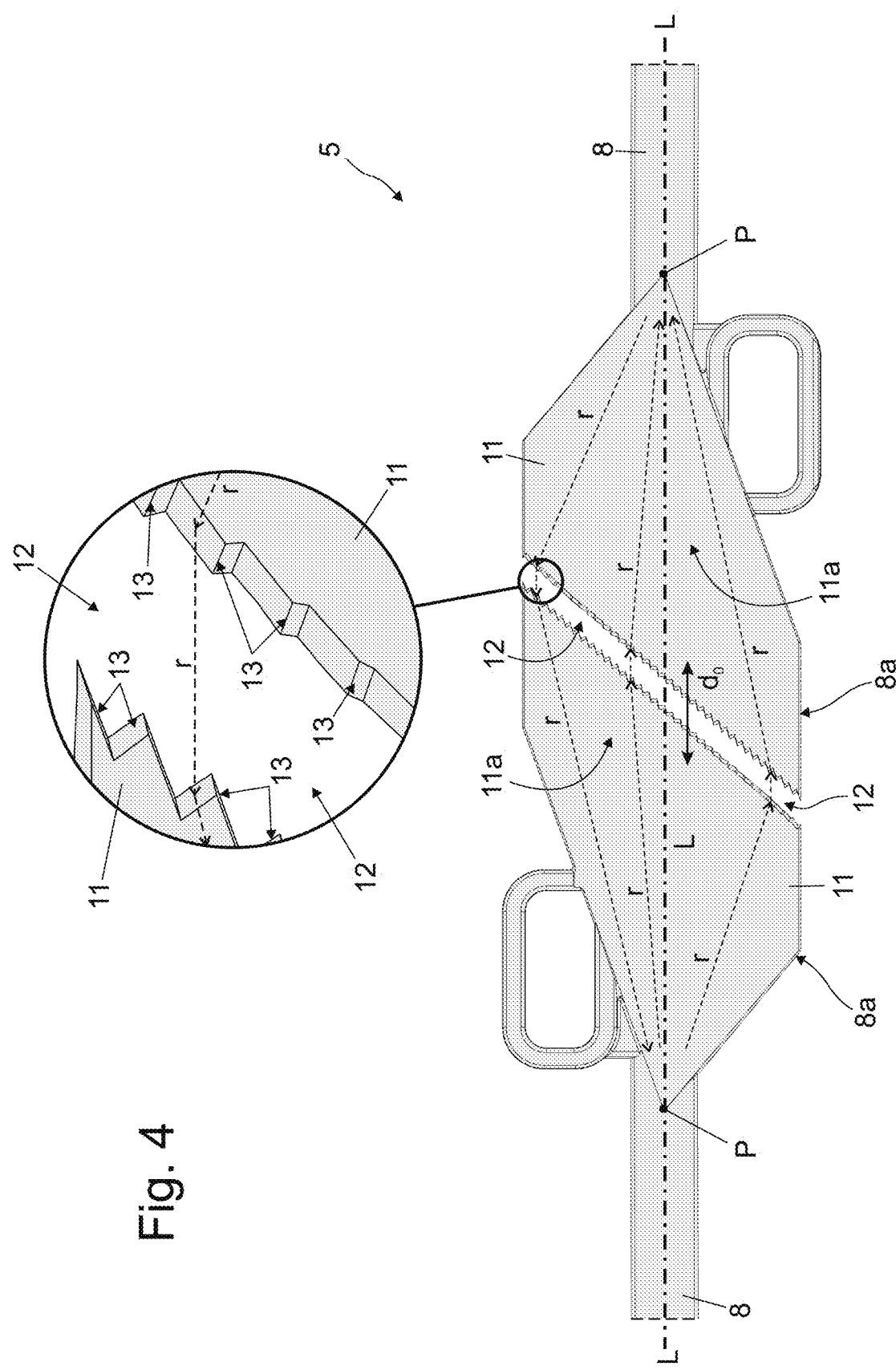
FIG. 4 is a front view on an enlarged scale of the heads of the two horizontal light-guide bars shown in FIG. 3.

With reference to FIGS. 1, 2 and 3, number 1 denotes as a whole an automotive light, i.e. a lighting device adapted to be firmly fixed to the front or rear of the body of a motor vehicle, with the function of emitting lighting signals adapted to signal/indicate the position of the vehicle and/or the sudden deceleration of the vehicle and/or the turning direction of the vehicle during travel and/or with the function of lighting the area around the vehicle.

In other words, the automotive light 1 is adapted to be fixed to the front or rear part of the vehicle body of a car, van, truck, motorcycle or other similar motor vehicle, to work as a headlight or taillight.

Clearly, the automotive light 1 could be also located on a lateral side of the car or other similar motor vehicle.

Preferably, the automotive light 1 is furthermore structured so as to be stably recessed in the vehicle body (not shown) and to surface outside of the vehicle.

In the example shown, in particular, the automotive light 1 is preferably structured to be stably recessed in the rear part of the vehicle body of a car or other similar motor vehicle.

In other words, the automotive light 1 is preferably a taillight for cars and the like.

Clearly, the automotive light 1 could also be placed on the hatchback of the vehicle.

Naturally, in a different embodiment, the automotive light 1 could also be structured so as to be simply fixed cantilevered to the front, side or rear part of the vehicle body (not shown).

With reference to FIGS. 1, 2 and 3, in particular, the automotive light 1 comprises: a substantially rigid and preferably made of plastic material, rear body 2 which is substantially basin-shaped and is structured so as to be firmly fixed to the vehicle body (not shown); and a substantially rigid and preferably made of plastic material, front half-shell 3, traditionally called lens, which is arranged to close the mouth of the rear body 2, preferably so as to surface outside of the vehicle body, and has one or more transparent or semi-transparent sectors, which are optionally also coloured.

In addition, the automotive light 1 also comprises one or more electrically-powered lighting assemblies, each of which emits light on command and is located inside the rear body 2, underneath a corresponding transparent or semi-transparent sector of the front half-shell 3, so as to selectively backlight the same transparent or semi-transparent sector of the front half-shell 3, preferably separately and independently of the other lighting assemblies of the automotive light.

Preferably, the or at least one of the lighting assemblies of the automotive light 1 is moreover structured so as to direct the light towards the corresponding facing transparent or semi-transparent sector of the front half-shell 3, with a prevalent component of the light beam substantially parallel to a predetermined reference optical axis, which is preferably substantially parallel to the longitudinal axis of the vehicle when the automotive light 1 is correctly mounted/placed on the vehicle body.

More in detail, the rear body 2 is preferably made of an opaque plastic material and is preferably structured so as to be at least partially recessed within a seat specially made in the rear part of the vehicle body.

Obviously, in a different embodiment, the rear body 2 could also be structured so as to be at least partially recessed within a seat specially made in the front or lateral part of the vehicle body (not shown), or so as to be simply fixed cantilevered on the front, side or rear part of the vehicle body.

The front half-shell 3, in turn, is preferably made of a transparent or semi-transparent plastic material, such as for example polymethylmethacrylate (PMMA) or polycarbonate (PC), and is preferably provided with a plurality of adjacent transparent or semi-transparent sectors, each of which is separately backlighted by a corresponding lighting assembly. Optionally, the front half-shell 3 may additionally comprise also opaque sectors.

With reference to FIGS. 1, 2 and 3, in particular, the automotive light 1 is preferably oblong in shape and is preferably adapted to be fixed to the vehicle body (not shown) in a substantially horizontal position.

In addition, the automotive light 1 is preferably also dimensioned so as to take up roughly the whole width of the vehicle body (not shown).

More in detail, the automotive light 1 is preferably longitudinally divided into an oblong-shaped central section and two stockier and wider lateral sections, that are arranged on opposite sides of the central section and preferably join seamlessly to the central section.

Preferably, the automotive light 1 is moreover shaped/dimensioned so that its oblong central section straddles the vertical midplane of the vehicle body when the automotive light 1 is correctly placed on the vehicle body.

The portions of front half-shell 3 that contribute to form the two lateral sections of the automotive light 1 are preferably both provided with at least one and more advantageously a plurality of adjacent transparent or semi-transparent sectors (three sectors in the example shown), each of which is separately backlighted by a corresponding lighting assembly 4.

The portion of front half-shell 3 that contributes to form the central section of the automotive light 1, on the other hand, is preferably provided with at least one substantially ribbon-like transparent or semi-transparent sector, which preferably extends seamlessly over the entire length of the central section and is separately backlighted by a further lighting assembly 5.

In addition, the lighting assembly 5 is also adapted to produce at least one luminous graphic symbol or sign of a predetermined shape, preferably at the centre of the transparent or semi-transparent ribbon-like sector of the front half-shell 3. Clearly, the shape of said luminous graphic symbol or sign can advantageously coincide with or roughly resemble the shape of the car manufacturer's logo to be realized.

With reference to FIGS. 1 to 6, the lighting assembly 5, therefore, is preferably at least partially located inside the portion of rear body 2 that contributes to form the central section of the automotive light 1.

Furthermore, the lighting assembly 5 comprises: a pair of longitudinal light-guide bars 8 of given length, preferably substantially straight and/or with a rounded section, which are made of photoconductive material, extend inside the rear body 2 one toward the other while remaining both substantially grazing the front half-shell 3, and have their respective proximal ends 8*a* adjacent and aligned to each other; and a pair of LEDs 9 (acronym for Light Emitting Diode) that are located within the rear body 2, each adjacent to the distal end 8*b* of a respective light-guide bar 8, and are oriented so as to direct the produced light within the body of the facing light-guide bar 8 through the distal end 8*b* of the same bar. The light emitted by each LED 9 then travels within the body of the respective light-guide bar 8 by total internal reflection, up to reach the proximal end 8*a* of the same bar.

In other words, the two light-guide bars 8 are separate and distinct from each other and extend inside the rear body 2 spaced one after the other, so as to substantially form the extension of one another.

Furthermore, each light-guide bar 8 has one of its own lateral sides, hereinafter referred to as the front lateral side, locally substantially grazing or in any case facing the front half-shell 3, and it is preferably structured so as to cause a part of the light travelling inside itself by total internal reflection to come out from said front lateral side in a controlled and progressive manner, in order to backlight an adjacent portion of the front half-shell 3, or rather of the transparent or semi-transparent ribbon-like sector of front half-shell 3.

More in detail, each light-guide bar 8 is preferably made of polymethylmethacrylate (PMMA) or other transparent plastic material, and preferably has a substantially circular or elliptical cross-section. Moreover, each light-guide bar 8 preferably has, along its rear lateral side, i.e. along its lateral side opposite the front half-shell 3 and facing the back of the rear body 2, a row of very small deflector prisms 10 or other reflective surface structures, which are shaped so as to deflect the incident light toward the opposite side of the light-guide bar 8, with an angle of incidence such that the light can freely come out of the light-guide bar 8 and reach the front half-shell 3.

In addition, with reference to FIGS. 3 to 6, the proximal ends 8a of the two light-guide bars 8 are shaped so as to form respective plate-like heads 11 that are locally substantially coplanar to one another and are arranged inside the rear body 2 one spaced alongside the other, so as to form/delimit therebetween a small transversal slot 12, which is inclined with respect to the local longitudinal axis L of the two light-guide bars 8.

More in detail, the transversal slot 12 is preferably substantially straight and is preferably inclined with respect to the local longitudinal axis L of the two light-guide bars 8 by an angle greater than 10° and advantageously ranging between 40° and 60°.

Clearly, the transversal slot 12 may also be perpendicular to the local longitudinal axis L of the two light-guide bars 8.

In other words, the transversal slot 12 is preferably inclined with respect to the local longitudinal axis L of the two light-guide bars 8 by an angle advantageously ranging between 10° and 90°.

In addition, each plate-like head 11 is arranged inside the rear body 2 with its front face 11a locally substantially parallel to or in any case facing the front half-shell 3 and with its rear face 11b facing the back of rear body 2, and preferably also has a diverging profile toward the transversal slot 12.

Figure 5:
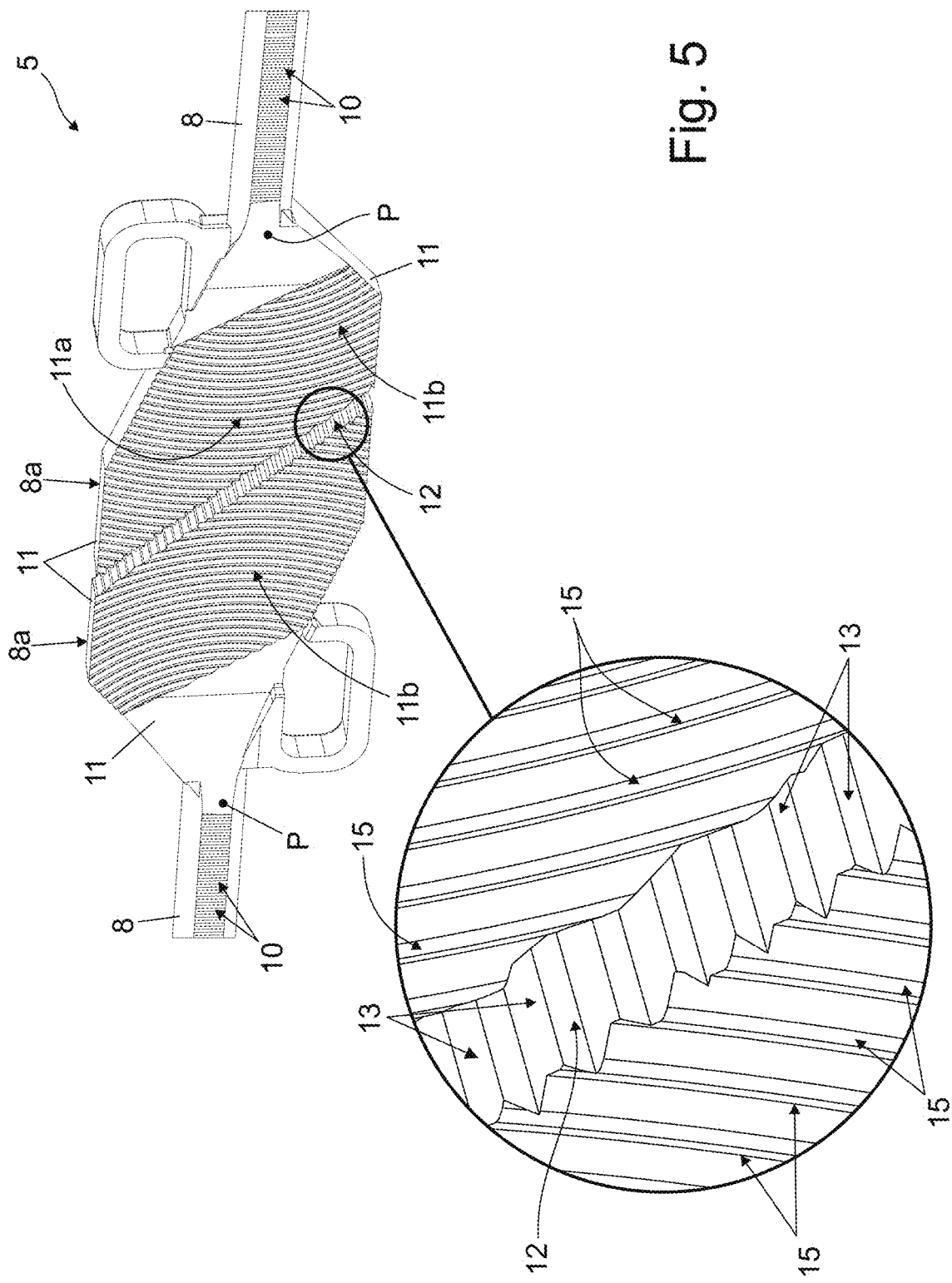

With particular reference to FIGS. 4, 5 and 6, additionally each of the plate-like heads 11 has, along its front edge, i.e. along its own edge delimiting/flanking the transversal slot 12, a series of collimator prisms 13 that are shaped so as to deflect the light rays r coming from the distal end 8b of the same light-guide bar 8 toward the facing front edge of the other plate-like head 11, while orienting all or at least most of them parallel to a predetermined direction $d_0$. Moreover, said predetermined direction $d_0$ is preferably locally substantially parallel to the laying plane of the plate-like heads 11 and is substantially parallel to the local longitudinal axis L of the two light-guide bars 8.

In addition, each plate-like head 11 is furthermore structured so as to cause the light of the LED 9 to come out from its front face 11a, i.e. from its face facing the front half-shell 3, in a substantially controlled and progressive manner.

More in detail, with reference to FIGS. 5 and 6, each plate-like head 11 preferably has, on its rear face 11b, a series of oblong deflector prisms 15 which extend side by side to one another, preferably along as many curved trajectories that are advantageously centred on the point P where the proximal end 8a of the light-guide bar 8 begins to widen and taper to form the plate-like head 11. Said oblong deflector prisms 15 are shaped so as to deflect the incident light toward the front face 11a of the plate-like head 11, with an angle of incidence such that the light can freely come out of the plate-like head 11 and reach the front half-shell 3.

Preferably, the oblong deflector prisms 15 moreover have a substantially triangular symmetrical cross-section, so as to deflect, toward the front face 11a of the plate-like head 11, both the light rays r coming from the distal end 8b of the same light-guide bar 8 and the light rays r coming from the transversal slot 12.

In other words, the oblong deflector prisms 15 preferably have a cross-section substantially in the shape of an isosceles triangle.

In the example shown, therefore, the two plate-like heads 11 are preferably provided with an optical system (i.e. the set formed by the collimator prisms 13 and the deflector prisms 15) with a mirror-like structure.

With reference to FIGS. 1, 2, 3 and 6, in addition the lighting assembly 5 preferably moreover comprises: a central shielding mask 16 with a substantially rigid and opaque structure, which is interposed between the front half-shell 3 and the proximal ends 8a of the two light-guide bars 8, so as to be backlighted by the light coming out of the same proximal ends 8a, and is provided with one or more limited light-passage areas 16a allowing the light coming out of the same proximal ends 8a to reach the front half-shell 3; and optionally also a light diffusion filter 17 which is designed to diffuse the light coming out of the same proximal ends 8a.

More in detail, the light diffusion filter 17 preferably has a plate-like structure and is interposed between the shielding mask 16 and the proximal ends 8a of the two light-guide bars 8. In other words, the light diffusion filter 17 is preferably separate and distinct from the central shielding mask 16 and is located beneath the same central shielding mask 16.

The light passage area or areas 16a of the central shielding mask 16 define(s) the shape of the luminous graphic symbol or sign to be realized.

Preferably, the lighting assembly 5 additionally also comprises, for each light-guide bar 8: a lateral shielding mask 18 with a substantially rigid and opaque structure, which is oblong in shape, is interposed between the front half-shell 3 and the rest of the light-guide bars 8, preferably seamlessly over the entire length of the light-guide bar 8, and is centrally provided with a limited, substantially ribbon-like, light-passage area 18a which is aligned with the front lateral side of the light-guide bar 8 and allows the light coming out of the same front side to reach the front half-shell 3; and optionally also a second light diffusion filter 19, which is adapted to diffuse the light coming out of the front lateral side of the same light-guide bar 8.

More in detail, the light diffusion filter 19 preferably has a plate-like structure and is interposed between the lateral shielding mask 18 and the front lateral side of the light-guide bar 8. In other words, the light diffusion filter 19 is preferably separate and distinct from the lateral shielding mask 18 and is located beneath the same lateral shielding mask 18.

With reference to FIGS. 2, 3 and 6, in the example shown, in particular, the central shielding mask 16 preferably basically consists of a rigid, opaque half-shell 20 advantageously made of plastic material, which is firmly fixed to the rear body 2, is shaped so as to cover the proximal ends 8a of both light-guide bars 8, and is centrally provided with one or more through openings that altogether copy the shape of the luminous graphic symbol or sign to be realized, and allow the light emitted by the proximal ends 8a of the two light-guide bars 8, or rather by the front faces 11a of the two plate-like heads 11, to reach the front half-shell 3.

Clearly, the through opening or openings of the rigid and opaque half-shell 20 form(s) the limited light-passage area(s) 16a of the central shielding mask 16.

In a different embodiment, however, the through opening or openings of the rigid and opaque half-shell 20 may be replaced by one or more sectors made of transparent or semi-transparent material, optionally also coloured.

Similarly, each lateral shielding mask 18 preferably basically consists of a rigid, opaque half-shell 21, oblong in shape and advantageously made of plastic material, which is firmly fixed to the rear body 2, is shaped so as to cover the light-guide bar 8 substantially for its entire length, and is centrally provided with a ribbon-like sector made of a transparent material, optionally also coloured, which is aligned to the front lateral side of the light-guide bar 8 and allows the light coming out of the same front lateral side to reach the front half-shell 3.

With reference to FIGS. 2, 3 and 6, the light diffusion filter 17, on the other hand, preferably consists of a translucent, substantially rigid plate 22 preferably made of plastic material, which is firmly fixed to the rear body 2 so as to extend grazing the front faces 11*a* of the two plate-like heads 11, and has a shape substantially complementary to that of the two plate-like heads 11, so as to be crossed by all the light coming out of the front faces 11*a* of the two plate-like heads 11.

Similarly, each light diffusion filter 19 preferably consists of a large, translucent and substantially rigid strip 23 preferably made of plastic material, which is firmly fixed to the rear body 2 so as to extend grazing the front lateral side of light-guide bar 8, preferably substantially for the entire length of the light-guide bar 8, so as to be crossed by all the light coming out of the front lateral side of the light-guide bar 8.

Preferably, at least one of the two translucent strips 23 is seamlessly joined to the translucent plate 22 forming the light diffusion filter 17.

In other words, the central light diffusion filter 17 is preferably made in one piece with at least one of the two lateral light diffusion filters 19.

General operation of the automotive light 1 is easily inferable from the above description and requires no further explanation.

On the other hand, as regards operation of the lighting assembly 5, the light rays r emitted by the LED 9 enter the light-guide bar 8 through the distal end 8*b* of the bar, and then travels inside the light-guide bar 8 toward the proximal end 8*a* of the bar by total internal reflection.

While bouncing inside the light-guide bar 8, some light rays r reach the deflector prisms 10 located along the rear lateral side of light-guide bar 8, and are deflected toward the front lateral side of light-guide bar 8, with an angle of incidence such as to freely come out of the light-guide bar 8 and reach the front half-shell 3.

The light rays r that arrive up to the proximal end 8*a* of light-guide bar 8, i.e. the plate-like head 11, and strike the oblong deflector prisms 15 located on the rear face 11*b* of the plate-like head 11, are deflected towards the front face 11*a* of the plate-like head 11 with an angle of incidence such as to freely come out of the light-guide bar 8 and backlight the central shielding mask 16.

The light rays r that arrive up to the proximal end 8*a* of the light-guide bar 8, i.e. the plate-like head 11, and strike the collimator prisms 13 located along the front edge of the plate-like head 11, on the other hand, are deflected/refracted outside of the plate-like head 11 in direction $d_0$.

After coming out of the front edge of the plate-like head 11, the light rays r cross the transversal slot 12 and reach the front edge of the plate-like head 11 of the other light-guide bar 8. Since they are already collimated in direction $d_0$, the light rays r crossing the transversal slot 12 enter into the plate-like head 11 of the other light-guide bar 8 and are deflected by the collimator prisms 13 of the second plate-like head 11, towards the point/focus P where the proximal end 8*a* of the second light-guide bar 8 begins to widen and taper to form the second plate-like head 11.

Clearly, while travelling inside the second plate-like head 11 towards the point/focus P of the same head, the light rays r strike the oblong deflector prisms 15 located on the rear face 11*b* of the second plate-like head 11 and are deflected by them towards the front face 11*a* of the plate-like head 11 with an angle of incidence such as to freely come out of the light-guide bar 8 and backlight the central shielding mask 16.

Each plate-like head 11 is therefore structured so as to cause the light coming from both LEDs 9 to come out of its front face 11*a*.

The advantages resulting from the particular structure of the lighting assembly 5 are considerable.

Experimental tests have shown that the luminous flux coming out of the two plate-like heads 11 has a high intensity and is very uniform, and therefore allows to backlight the central shielding mask 16 in an optimal way.

In addition, the lighting assembly 5 is extremely compact and can therefore be easily accommodated in the central section of the automotive light 1.

Last but not least, the lighting assembly 5 uses a small number of LEDs, so it is particularly economical to produce.

It is finally clear that that modifications and variations may be made to the automotive light 1 without however departing from the scope of the present invention.

For example, in a less sophisticated version, the LEDs 9 can be replaced by normal filament lamps or other electrically-powered light sources.

The invention claimed is:

1. An automotive light (1) comprising: a rear body (2) adapted to be fixed to the vehicle; a front half-shell (3) placed to close a mouth of said rear body (2); and at least a first lighting assembly (5) that is located inside the rear body (2) and is adapted to backlight a corresponding transparent or semi-transparent sector of the front half-shell (3);

said automotive light (1) being characterized in that said first lighting assembly (5) comprises: a pair of light-guide bars (8) made of photoconductive material, which extend toward each other inside the rear body (2), while remaining both substantially grazing the front half-shell (3), and have respective proximal ends (8*a*) of the pair of light-guide bars (8) adjacent and aligned with each other; and a pair of electrically-powered light sources (9) that are located within the rear body (2), each adjacent to a distal end (8*b*) of a respective light-guide bar (8), and are oriented so as to direct the light produced into the body of the facing light-guide bar (8);

the proximal ends (8*a*) of said light-guide bars (8) being shaped so as to form respective plate-like heads (11) that are locally substantially coplanar to one another and are arranged inside the rear body (2) one spaced beside the other, so as to form/delimit therebetween a small transversal slot (12); each plate-like head (11) being arranged with a front face (11*a*) facing the front half-shell (3) and being structured so as to cause the light from said light sources (9) to come out of the same front face (11*a*).

2. The automotive light according to claim 1, wherein each plate-like head (11) has, along a front edge, a series of collimator prisms (13) that are shaped so as to deflect light rays (r) coming from the distal end (8b) of the same light-guide bar (8) toward the facing front edge of the other plate-like head (11), while orienting light rays parallel to a predetermined direction ($d_0$).

3. The automotive light according to claim 2, wherein said predetermined direction ($d_0$) is substantially parallel to a laying plane of the plate-like heads (11) and to a local longitudinal axis (L) of the light-guide bars (8).

4. The automotive light according to claim 1, wherein each plate-like head (11) has a diverging profile toward said transversal slot (12).

5. The automotive light according to claim 4, wherein each plate-like head (11) has, on a rear face (11b), a series of oblong deflector prisms (15) which extend side by side to one another along curved trajectories that are centred substantially on a point (P) where the proximal end (8a) of the light-guide bar (8) begins to widen to form the same plate-like head (11).

6. The automotive light according to claim 1, wherein the transversal slot (12) is substantially straight and/or is inclined with respect to a local longitudinal axis (L) of the light-guide bars (8).

7. The automotive light according to claim 1, wherein each light-guide bar (8) is structured so as to cause the light to come out from an own lateral side facing said front half-shell (3), so as to backlight an adjacent portion of the same front half-shell (3).

8. The automotive light according to claim 1, wherein each light-guide bar (8) is substantially straight.

9. The automotive light according to claim 1, wherein each light-guide bar (8) has a rounded section.

10. The automotive light according to claim 1, wherein said first lighting assembly (5) moreover comprises a first shielding mask (16) that has an opaque structure, is interposed between the front half-shell (3) and the proximal ends (8a) of both light-guide bars (8) so as to be backlighted by the light coming out of the same proximal ends (8a), and is provided with one or more light-passage areas (16a) that allow the light to reach the front half-shell (3); said light-passage area o areas (16a) defining the shape of a luminous graphic symbol or sign to be produced.

11. The automotive light according to claim 10, wherein said first lighting assembly (5) moreover comprises a first light diffusion filter (17) that is adapted to diffuse the light coming out of the proximal ends (8a) of both light-guide bars (8).

12. The automotive light according to claim 11, wherein said first light diffusion filter (17) is separate and distinct from the first shielding mask (16) and is interposed between the proximal ends (8a) of both light-guide bars (8) and said first shielding mask (16).

13. The automotive light according to claim 7, wherein said first lighting assembly (5) moreover comprises, for each light-guide bar (8), a second, oblong-shaped shielding mask (18) that has an opaque structure, is interposed between the light-guide bar (8) and the front half-shell (3), and is centrally provided with a substantially ribbon-like, light-passage area (18a) which is aligned with said lateral side of the light-guide bar (8) and allows the light coming out of the same lateral side to reach the front half-shell (3).

14. The automotive light according to claim 13, wherein said first lighting assembly (5) moreover comprises, for each light-guide bar (8), a second light diffusion filter (19) that is designed to diffuse the light coming out of the lateral side of the light-guide bar (8).

15. The automotive light according to claim 1, wherein each light source (9) includes one or more LEDs.

16. The automotive light according to claim 1, characterized in that it the rear body is oblong in shape and is fixable to the vehicle body in a substantially horizontal position.

17. The automotive light according to claim 16, characterized in that the rear body is longitudinally divided into an oblong-shaped central section and into two wider lateral sections that are arranged on opposite sides of the central section and are joined to the same central section; said first lighting assembly (5) being located in the central section of the automotive light.

18. The automotive light according to claim 17, characterized in that the rear body comprises, inside each lateral section of the automotive light, at least a second lighting assembly (4) which is located inside the rear body (2) and is adapted to backlight a corresponding transparent or semi-transparent sector of the front half-shell (3).

\* \* \* \* \*